No. 672,005. Patented Apr. 16, 1901.
J. E. NAILL.
HORSE DETACHER.
(Application filed Feb. 9, 1901.)
(No Model.)
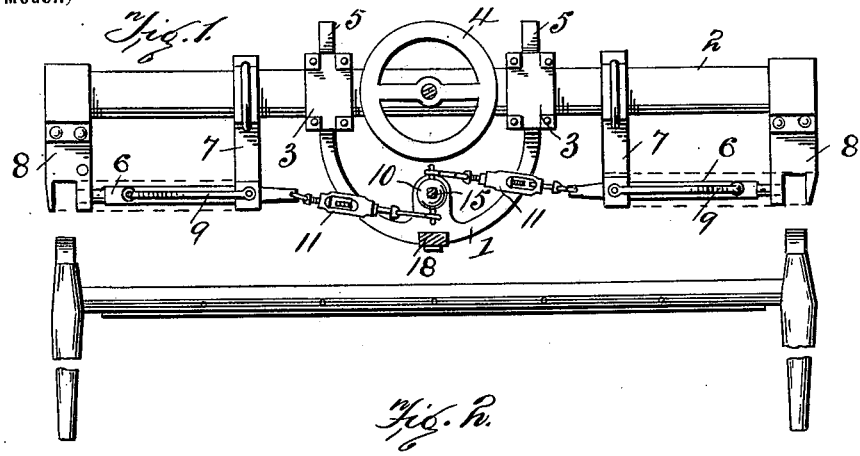
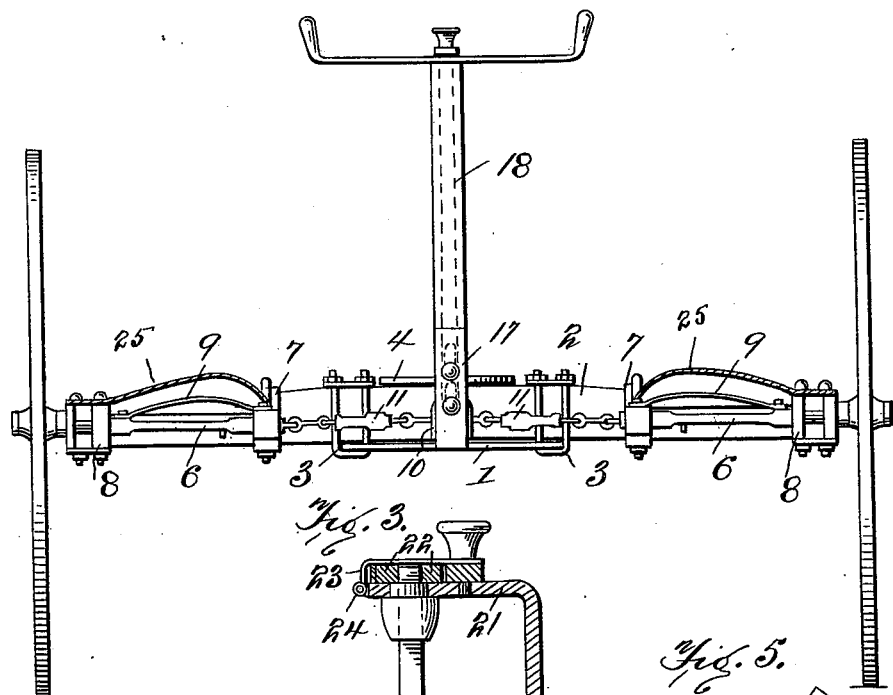
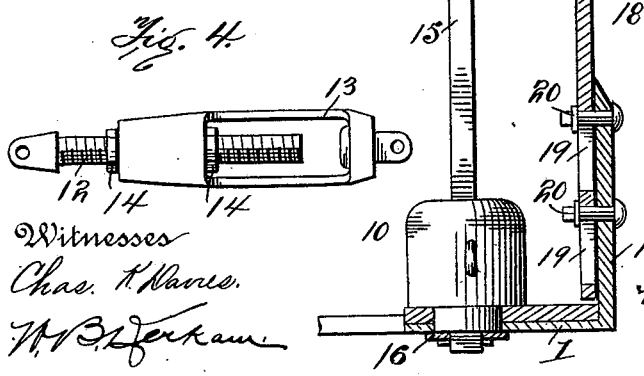
Witnesses
Chas. K. Davies.
W. B. Zerkam.
Inventor
John E. Naill
by J. T. Cameron
his Attorney

UNITED STATES PATENT OFFICE.

JOHN E. NAILL, OF STAUNTON, VIRGINIA.

HORSE-DETACHER.

SPECIFICATION forming part of Letters Patent No. 672,005, dated April 16, 1901.

Application filed February 9, 1901. Serial No. 46,711. (No model.)

*To all whom it may concern:*

Be it known that I, JOHN E. NAILL, a resident of Staunton, Virginia, have invented a new and useful Improvement in Horse-Detachers, which invention is fully set forth in the following specification.

My invention relates to horse-detaching devices whereby a fractious or runaway horse or horses may be quickly detached from the vehicle and injury thereto as well as to its occupants avoided. In United States Patent No. 413,240, granted me October 22, 1889, I have shown a device of this character and the object of the present invention is to provide certain improvements in the device described in said patent, to the end that it may be more certain in its operation and quickly and easily applied to any style of vehicle. Fifth-wheels of different vehicles differ in size, dashboards project different distances in front of the fore axle and are of different heights, while thill and tongue couplings are differently spaced upon different vehicles. All of these varieties in the construction of vehicles render it difficult to construct a horse-detacher which can be readily attached to any vehicle, and to construct different sizes and styles of detachers to fit the different conditions existing among vehicles would largely increase the first cost of the device.

A further difficulty experienced in the practical operation of horse-detachers is that the parts are liable to become clogged with snow, ice, or mud to such an extent as to render them inoperative at the moment when an emergency arises. The objects of the present invention are to provide a horse-detacher that may readily be attached to any vehicle and with its working or movable parts so protected as to exclude snow, ice, and mud therefrom, to the end that they may be always in operative condition.

With these objects in view the invention consists in a horse-detacher of the general construction shown in my patent aforesaid provided with means for adjustably mounting it upon the axle to conform to any size of fifth-wheel or projection or height of dashboard, means for adjusting the connections between the thill-bolts and the operating mechanism therefor, together with protecting means for excluding dirt and ice from said bolts and mechanism.

The inventive idea involved may receive various mechanical expressions, one of which I have illustrated in the accompanying drawings, in which—

Figure 1 is a plan view of a front axle with my detacher secured thereto, the operating-shaft and upright being shown in section and the thills shown detached. Fig. 2 is a front elevation thereof; and Fig. 3 is a vertical section, with parts in elevation, of the operating-shaft and its supporting-standard. Figs. 4 and 5 are detail views of parts hereinafter described.

Referring to the drawings, 1 is a U-shaped support, adjustably secured in a horizontal position to the axle 2 by suitable clamps 3 3 on opposite sides of the fifth-wheel 4, the legs 5 5 of the support 1 being of sufficient length to enable the support to project a greater or less distance in front of the axle, as may be rendered necessary by the size of the fifth-wheel or the forward projection of the dashboard. The bolts 6 6 slide in clips 7 7 and shackle-boxes 8 8, as in my prior patent aforementioned, and are withdrawn against the tension of their springs 9 9 by the revolution of the hub 10, which is connected to said bolts 6 6 by adjustable connections or links 11 11, one of which is shown in detail in Fig. 4, in which 12 is a screw-threaded rod having a swivel-nut 13 thereon, with lock-nuts 14 14 for locking it in any adjusted position on the rod 12. These swivel-links are connected at one end to the bolts 6 6 and at the other end to the hub 10 by suitable flexible connections, as clearly shown in Figs. 1 and 2, and by turning the swivel 13 the connection between the hub 10 and bolts 6 6 may be drawn taut, so as to avoid looseness and rattling of the parts. This also causes the bolts to respond promptly to the operation of the hub. By this means the device may be readily adjusted to operate with precision within the limits of variation of distance between thill shackle-boxes on different vehicles. The hub 10 is mounted to turn on support 1 and is of enlarged diameter, so as to efficiently cover the bearing therefor in the support 1, as will be clearly understood from an inspection of Fig. 3, and the square operating-shaft 15 passes downward through the hub 10 and projects therefrom at the bottom below the support 1, where it is provided with a washer 16, which effectively covers and protects the bearing against the entrance of snow or dirt from below. The support 1 has an upwardly-projecting arm 17, to which the standard 18 is secured by the slot-and-bolt connection 19 20. (Shown in Fig. 3.) By means of this connection the height of the standard 18 may be adjusted so that its inwardly-turned arm 21, which forms the upper bearing for the operating-shaft 15, may lie close to the top of the dashboard, whatever its height may be. The shaft 15 is operated to turn the hub 10 and withdraw the thill-bolts 6 6 through the medium of the handle-bar 22, which bar is normally restrained against turning by the clasp or lock 23, hinged at 24 to the arm 21. When originally constructed, the shaft 15 is made slightly longer than necessary and is cut to the proper length to project through the arm 21 when the standard 18 has been adjusted. For the purpose of protecting the bolts 6 6 and the springs 9 9 from snow and mud I provide a shield or cover 25, (clearly shown in Fig. 5,) which I place over said bolts and springs, so as to inclose the same, thereby insuring their freedom from clogging at all times and under all conditions of weather.

It will be seen that I have provided a horse-detacher that may be manufactured of a standard size capable of adjustment, so as to fit a great variety of vehicles, and which will at all times be free from clogging action due to snow, dirt, or other foreign matter, thereby insuring its prompt operation in time of emergency.

Having thus described my invention, I claim—

1. In a horse-detaching device, the combination of the thill-bolts and shackle-boxes, with means for operating the bolts to release the thills, and a support for said operating means adjustable longitudinally of the vehicle whereby the same may be applied to vehicles having dashboards differing in the extent of forward projection.

2. In a horse-detacher, the combination of the thill-bolts and shackle-boxes, with an operating-shaft for said bolts, a bottom bearing for said shaft adjustable longitudinally of the vehicle, and a top bearing for said shaft adjustable vertically.

3. In a horse-detacher the combination of the thill-bolts and shackle-boxes, with an operating-shaft for said bolts, bottom bearings for said shaft adjustable longitudinally of the vehicle, a vertically-adjustable top bearing for said shaft and means protecting said bearings from dirt and the like.

4. In a horse-detacher the combination of the thill-couplings and the operating-shaft therefor, with a lower support for said shaft, and a vertically-adjustable standard mounted on said support and carrying the top bearing for said shaft.

5. In a horse-detacher the combination of the thill-couplings and the operating-shaft therefor, with a lower support for said shaft adjustable longitudinally of the vehicle, a vertically-adjustable standard on said support and carrying the top bearing for the shaft, and adjustable connections between the shaft and thill-couplings.

6. In a horse-detacher the combination of the shackle-boxes, the thill-bolts and their springs, with an inclosing case or cover for said bolts and springs.

7. In a horse-detacher the combination of the thill-couplings and the operating-shaft therefor, of a U-shaped support for said shaft, clamps on opposite sides of the fifth-wheel adjustably supporting said support, a hub on the shaft covering the bearing on said support and excluding foreign matter therefrom, a vertically-adjustable standard or support carrying the upper or top bearing for the shaft and adjustable connections between said hub and the thill-bolts.

In testimony whereof I have signed this specification in the presence of two subscribing witnesses.

JOHN E. NAILL.

Witnesses:
H. ARGENBRIGHT,
F. M. HOGE.